United States Patent
Sassoon

(10) Patent No.: US 7,273,306 B2
(45) Date of Patent: Sep. 25, 2007

(54) LENS FOR VEHICLE MARKER

(76) Inventor: Charles I. Sassoon, 203C W. Shore Rd., Kings Point, NY (US) 11024

( * ) Notice: Subject to any disclaimer, the term of this patent is extended or adjusted under 35 U.S.C. 154(b) by 191 days.

(21) Appl. No.: 10/954,839

(22) Filed: Sep. 30, 2004

(65) Prior Publication Data

US 2006/0067085 A1    Mar. 30, 2006

(51) Int. Cl.
*B60Q 1/06* (2006.01)
(52) U.S. Cl. .................. 362/540; 362/545; 362/522
(58) Field of Classification Search ............. 362/237, 362/240, 242, 244, 246, 330, 332, 333, 334, 362/336, 338, 485, 522, 540, 543, 544, 545
See application file for complete search history.

(56) References Cited

U.S. PATENT DOCUMENTS

| | | | |
|---|---|---|---|
| D82,628 S | 11/1930 | Schnell | |
| 1,789,525 A | 1/1931 | Hoff | |
| D106,674 S | 10/1937 | Osbrink | |
| D126,993 S | 5/1941 | Trautner | |
| 2,542,114 A * | 2/1951 | Bridge | 362/330 |
| D190,606 S | 6/1961 | Angler | |
| 3,222,512 A * | 12/1965 | Dickson | 362/540 |
| 3,223,834 A | 12/1965 | Lorio | |
| 3,633,021 A * | 1/1972 | Rossi | 362/485 |
| D237,157 S | 10/1975 | Schaefer | |
| D237,158 S | 10/1975 | Schaefer | |
| D266,910 S | 11/1982 | Brickwood | |
| 4,653,955 A | 3/1987 | Racs | |
| D306,767 S | 3/1990 | Ziaylek | |
| D357,205 S | 4/1995 | Sandino | |
| 5,449,244 A | 9/1995 | Sandino | |
| D393,100 S | 3/1998 | Fiorato | |
| D400,274 S | 10/1998 | Ziaylek | |
| D420,302 S | 2/2000 | Barnhart | |
| D446,323 S | 8/2001 | Hurayt | |
| 6,612,728 B2 * | 9/2003 | Roller et al. | 362/545 |
| 7,055,996 B2 * | 6/2006 | Pond et al. | 362/544 |
| 2002/0067548 A1 | 6/2002 | Terhovhanoisian | |

OTHER PUBLICATIONS

Extended European Search Report issued in European Patent Application No. 05020463.5, Jan. 2, 2007.
U.S. Appl. No. 29/194,397, filed Nov. 24, 2003, Sassoon.

* cited by examiner

*Primary Examiner*—Y. My Quach-Lee
(74) *Attorney, Agent, or Firm*—Stroock & Stroock & Lavan LLP

(57) ABSTRACT

The present invention relates to a lens for a light-emitting diode (LED) vehicle marker having a projection for increasing visibility of the vehicle to which the marker is affixed. In accordance with one embodiment of the present invention, the lens includes a generally elongated projection which increases longitudinal illumination.

17 Claims, 4 Drawing Sheets

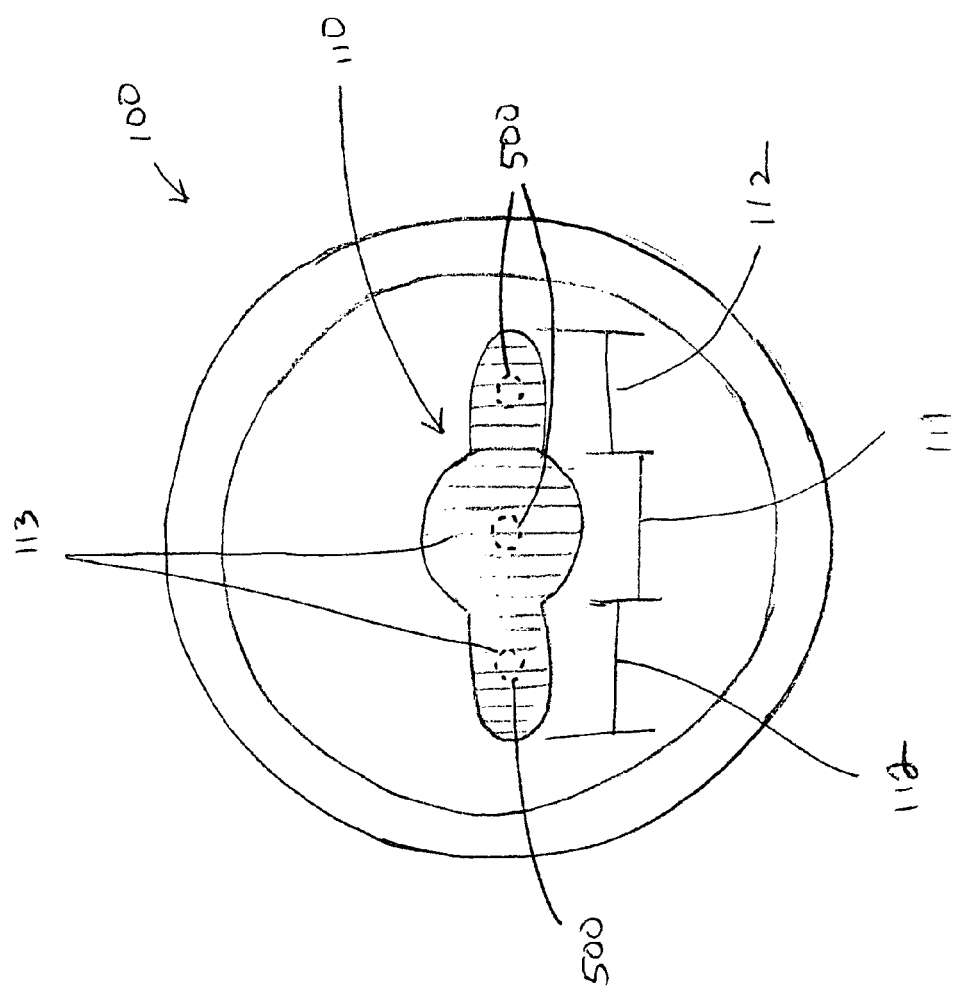

LENS FOR VEHICLE MARKER

BACKGROUND OF THE INVENTION

1. Field of the Invention

The present invention relates to a lens for use with markers for vehicles that have a light-emitting diode (LED) light source and, more particularly, to a lens having a projection for increasing visibility from the side of the vehicle to which the marker is affixed.

2. Description of Related Art

Vehicle markers, such as clearance markers, reflective devices and similar types of markers used on vehicles are typically mounted to the front, rear and sides of a vehicle, such as an automobile or truck/trailer combination, to indicate the overall height, width and length of the vehicle. For example, § 108 of the Federal Motor Vehicle Safety Standards and Regulations ("FMVSS") requires all vehicles to have a certain number of vehicle markers, including clearance markers and reflective devices, mounted permanently to a part of the vehicle. According to the FMVSS, the Society of Automotive Engineers ("SAE") is the organizational body directed to setting standards and recommended practices for compliance with the provisions of the FMVSS. The purpose of these standards and practices is to reduce traffic collisions and deaths and injuries resulting therefrom, by providing adequate illumination of both the roadway and the vehicle in daylight and in darkness (or other conditions of reduced visibility).

Vehicle markers are mounted on the vehicle to provide light to the front, rear and sides of a vehicle in order to indicate the overall width, height and length of the vehicle. For example, according to SAE standards, a red clearance marker is used to indicate the rear of the vehicle and an amber clearance marker is used to indicate the front of the vehicle. Furthermore, a "PC" rating is an indication that according to the SAE standards, the marker can be seen easily from both the side and the front. Therefore, to achieve a "PC" rating, the clearance marker must emit light in an arc-like pattern.

Vehicle markers include a housing, which includes the light source, and a lens, which protects the light source from the natural elements. Typically, the light source for such markers is either a standard high-intensity incandescent bulb, which has a relatively short life span and is susceptible to damage, or a light-emitting diode (LED), which has a greater operating life.

One of the problems associated with using an LED light source is the difficulty in spreading the illumination in a longitudinal direction, i.e., an arc-like pattern. While LEDs can have an operating life of up to 100,000 hours before degradation commences, the light emitted from LEDs is in a narrow cone-shaped pattern. More specifically, an LED is a directional light source in which the maximum emitted light is in a direction perpendicular to the light surface. A typical radiation pattern for an LED is within 20° of the direction of the maximum light, which is significantly less than the SAE standard for visibility for a side clearance marker. Accordingly, an LED light source is not ordinarily used for side clearance markers because of the inability of the LED clearance markers presently known in the art to spread the light in an arc-like pattern as required by SAE standards.

Thus, there exists a need to provide a lens suitable for use with an LED vehicle marker which is relatively inexpensive and easy to manufacture and which provides the requisite illumination pattern.

SUMMARY OF THE INVENTION

The present invention satisfies the foregoing and other needs. The present invention relates to a lens for use with a vehicle marker having an LED light source. In one embodiment, the lens of the present invention is used with a clearance marker and includes an elongated projection which permits longitudinal illumination.

In accordance with one embodiment of the present invention, the lens includes a lens periphery joined to the housing assembly of the clearance marker thereby creating a light source chamber, and a lens structure joined to the lens periphery. The lens structure has a front surface, which includes a projection for directing light emitting from an LED light source outwardly from the clearance marker in an arc-like pattern.

BRIEF DESCRIPTION OF THE DRAWINGS

The particular features and advantages of the invention as well as other objects will become apparent from the following description taken in connection with the accompanying drawings, in which:

FIG. 5 is a front elevational view of a clearance marker incorporating a lens in accordance with one embodiment of the present invention.

DESCRIPTION OF EXEMPLARY EMBODIMENTS

Certain exemplary embodiments of the present invention will now be described with reference to the drawings. In general, such embodiments relate to a lens containing a projection for directing light emitting from an LED light source outwardly from a vehicle marker in a substantially arc-like pattern, preferably so that light emitting from the plurality of LEDs can be viewed at an angle greater than 20° axial orientation of each LED.

Figure 1:
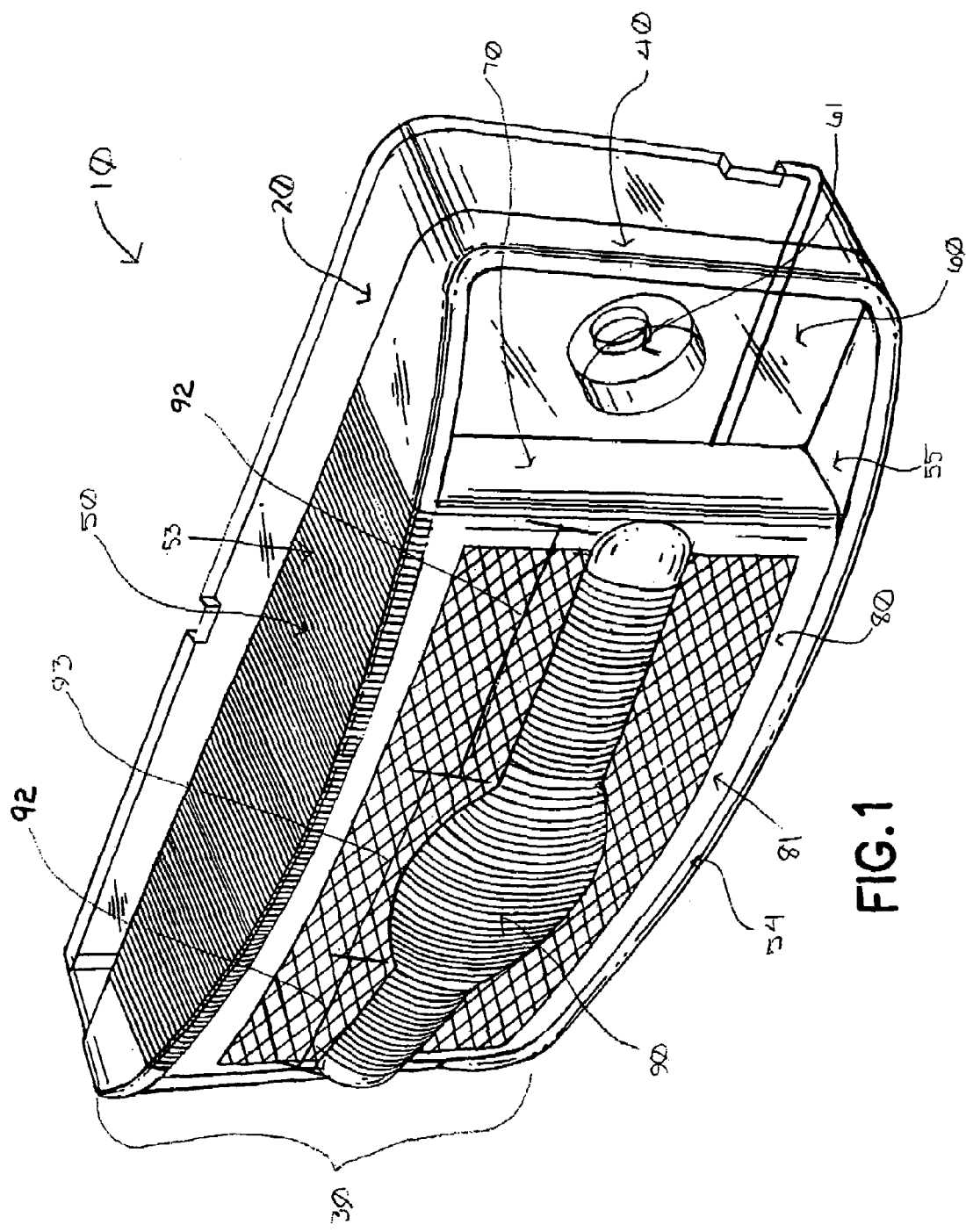
FIG. 1 is a front perspective view illustrating a clearance marker incorporating a lens in accordance with one embodiment of the present invention.

Turning to FIG. 1 (a front perspective view), according to a first embodiment of the present invention, a clearance marker 10, which includes a housing 20 and a lens 30, is particularly suited for use with an LED light source. Lens 30 comprises a projection or any other raised, translucent surface which can disperse light emitting from an LED light source in an outwardly, substantially arc-like pattern.

Considering a substantially rectangular-shaped clearance marker for illustration purposes only, and noting that any shape and/or size clearance marker, if used, can be (but need not be) identical in construction, lens 30 comprises a peripheral wall 40, which supports opposing side walls 50 and 54 and mounting walls 60 and 62. Opposing side walls 50 and 54 and mounting walls 60 and 62 support opposing end walls 70 and 72, which support an arcuate projection wall 80. Arcuate projection wall 80 includes an arcuate projection 90 which allows light from an LED light source (not depicted) to spread outwardly in a substantially arc-like pattern.

As shown in FIG. 1, projection 90 is a substantially elongated form and has a projection middle portion 93 and opposing projection side portions 92. In a first embodiment of the present invention, the width of projection middle portion 93 is equally greater than the width of the opposing projection side portions 92.

Opposing side walls 50 and 54, each having an inner surface, 51 and 55, respectively, and an outer surface, 53 and 57, respectively, opposing end walls 70 and 72 and arcuate projection wall 80 create a chamber for accommodating the LED light source (not depicted) of housing 20. In a first embodiment of the present invention the chamber is substantially a rectangle and accommodates an LED light source in which the LEDs are arranged in a substantially lateral direction.

Figure 2:
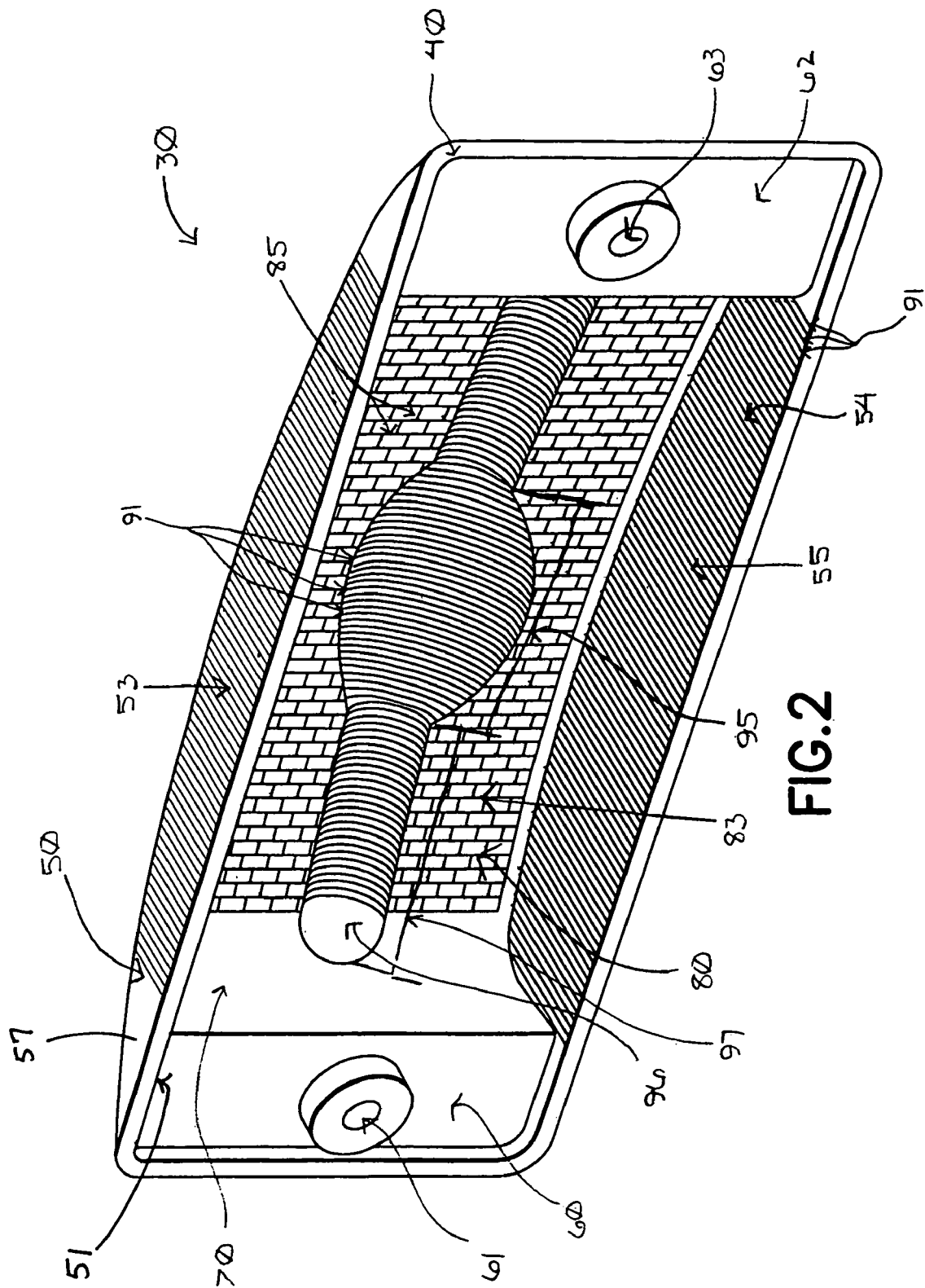
FIG. 2 is a back perspective view illustrating a lens in accordance with one embodiment of the present invention.

Turning to FIG. 2 (a back perspective view), with reference to FIG. 1, arcuate projection wall 80 has a front surface 81 and a back surface 83, which comprises a recessed projection channel 96. In a first embodiment of the present invention, recessed projection channel 96 creates, and corresponds to, projection 90. Accordingly, recessed projection channel 96 is a substantially elongated form and has a channel middle portion 95 and opposing channel side portions 97, wherein the width of channel middle portion 95 is equally greater than the width of opposing channel side portions 97.

As shown in FIGS. 1 and 2, in a first embodiment of the present invention, mounting walls 60 and 62 include mounting apertures 61 and 63. Mounting apertures 61 and 63 are contiguous to mounting apertures within housing 20, all which mounting apertures are designed to receive a screw, or other such mounting fixture, therethrough for affixing clearance marker 10 to a vehicle.

As shown in FIGS. 1 and 2, in a first embodiment of the present invention, recessed projection channel 96 and inner surfaces 51 and 55 of opposing side walls 50 and 54 can include longitudinally-spaced ribs, or grooves, 91 for increasing the dispersion of light from the LED light source. Additionally, in a first embodiment of the present invention, as shown in FIG. 2, back surface 83 of arcuate projection wall 80 can include reflective facets 85 arranged in a substantially segmented fashion for reflecting light to one or more sides of the vehicle.

Lens 30 and any components thereof can be made from any material that allows light to pass through it, such as, for example, any transparent or translucent material, including glass or plastics. In a first embodiment of the present invention, lens 30 is produced by forming a polycarbonate.

Figure 3:
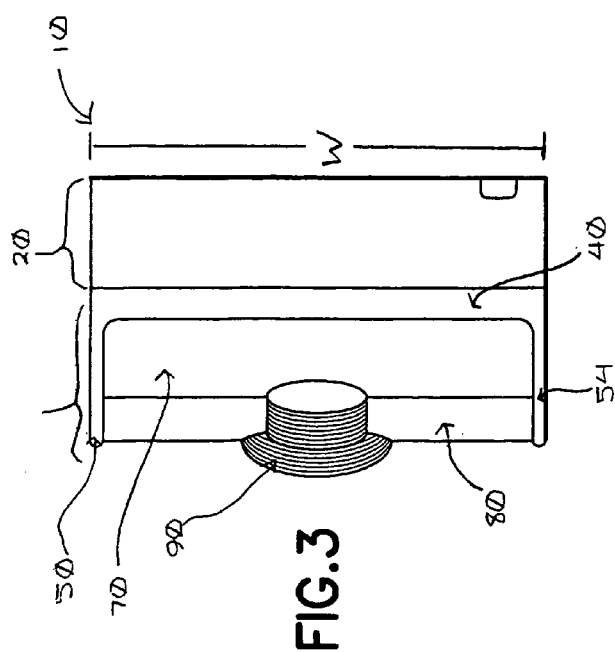
FIG. 3 is a right-side plan view of a clearance marker incorporating a lens in accordance with one embodiment of the present invention.
Figure 4:
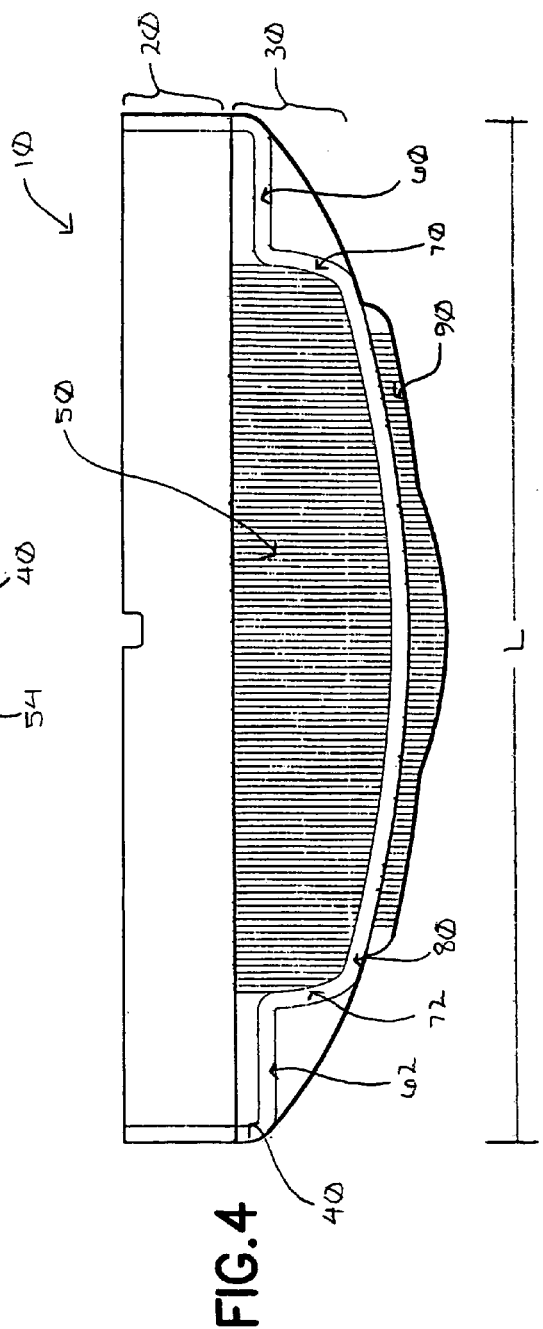
FIG. 4 is a top plan view of a clearance marker incorporating a lens in accordance with one embodiment of the present invention.

The dimensions of lens 30 and components thereof can be varied as desired to provide lenses for any size, shape or type of vehicle marker that meets the SAE standards. While a substantially rectangular-shaped housing and lens are depicted, the present invention can be used with any size and/or shape housing and lens including, for example, a circle, a beehive or a square. Furthermore, while the foregoing depicts a the present invention for use with a clearance marker, it should be understood that the present invention can be used with any type of vehicle marker, including, for example, a stop turn tail marker. Accordingly, it should be understood that the dimensions and proportions shown in FIGS. 1 through 4 are provided for illustration purposes only and do not limit the invention to any particular dimensions or proportions. As shown in FIGS. 3 and 4, in a first embodiment of the present invention, clearance marker 10 and lens 30 have a width (W) of about 2 inches and a length (L) of about 6 inches.

As will be appreciated by those skilled in the art, lens 30 of the present invention provides for greater dispersion of light emitted from an LED light source in a substantially arc-like pattern. An LED is a directional light source in which the maximum light emitted in a direction perpendicular to the light surface. Lens 30 of the present invention includes a projection 90 that outwardly extends an area of the arcuate projection wall 80, through which light is emitted from the LED light source, thereby permitting the light to be seen from a top view (as depicted in FIG. 4) and bottom view (not depicted) of clearance marker 10.

Additionally, according to a first embodiment of the present invention in which a recessed projection channel 96 formed within the back surface 83 of the arcuate projection wall 80 creates projection 90, recessed projection channel 96 creates additional space in the light source chamber thereby permitting different arrangements of the LEDs. Typically, the LEDs in a clearance marker are arranged in a lateral direction and are directed outward, i.e., in a direction substantially perpendicular to the arcuate projection wall. According to a first embodiment of the present invention, the LEDs can be arranged so that the LEDs proximate the projection side portions 92 of projection 90 emit light in a direction substantially parallel to the arcuate projection wall.

FIG. 5 shows an embodiment of the invention wherein the lens comprises a substantially circular shape. Lens 100 comprises an arcuate projection 110 having a projection middle portion 111 and two projection side portions 112, further comprising a plurality of grooves 113. In accordance with the exemplary embodiment of the invention as shown, arcuate projection 110 is located opposite a plurality of LED's 500. Whereas the embodiments shown and discussed herein comprise two side projection portions 92, 112, as shown in FIGS. 1 and 5, it is to be understood that arcuate projection 90, 110 can include a different number of projection side portions 92, 112 as a matter of application specific to design choice without deviating from the scope of the invention.

The foregoing features of the present invention permit light emitting from an LED to be viewed from the side of a clearance marker. Accordingly, the present invention provides for a lens for use with an LED clearance marker which meets the requisite SAE standards for use as a side clearance marker while permitting the benefits enjoyed with using an LED light source.

Those skilled in the art will recognize that the apparatus of the present invention has many applications, may be implemented in many manners and, as such, is not to be limited by the foregoing exemplary embodiments and examples. In this regard, any number of the features of the different embodiments described herein may be combined into one single embodiment. Moreover, the scope of the present invention covers conventionally known and future developed variations and modifications to the apparatus described herein, as would be understood by those skilled in the art.

What is claimed is:

1. A lens mountable to a housing of a vehicle marker having a plurality of light emitting LEDs, the lens being formed of a translucent material and having a first arcuate projection having a first width, said first width having a first curvature and a second arcuate projection having a second width, said second width having a second curvature, wherein the second curvature is different from the first curvature and is shaped to change the angle of dispersion of light emitted from the lens between the first arcuate projection and the second arcuate projection along the length of the first and second arcuate projections, each arcuate projection being disposed at a position opposite the plurality of LEDs of the vehicle marker so that light emitting from the plurality of LEDs can be viewed at an angle greater than 20° axial orientation of each LED.

2. The lens of claim 1, wherein the lens further comprises a channel for defining the first and second arcuate projections, the channel being adapted to be in facing relationship with the plurality of LEDs of the vehicle marker.

3. The lens of claim 1, wherein the vehicle marker is a clearance marker.

4. The lens of claim 1, wherein the translucent material is a polycarbonate.

5. The lens of claim 1, wherein the translucent material is colored so that the lens complies with a standard set by the Society of Automotive Engineers.

6. The lens of claim 1, wherein the vehicle marker is adapted to be affixed to a vehicle and wherein the translucent material is substantially red in color so that the vehicle marker can be used to indicate a rear end of the vehicle.

7. The lens of claim 1, wherein the vehicle marker is adapted to be affixed to a vehicle and wherein the translucent material is substantially amber in color so that the vehicle marker can be used to indicate a front end of the vehicle.

8. The lens of claim 1, wherein the lens further comprises a plurality of longitudinally-spaced ribs formed within the first and second arcuate projections for increasing dispersion of light emitting from the plurality of LEDs.

9. The lens of claim 1, wherein the lens further comprises a plurality of facets arranged in a segmented pattern formed within the lens so that the lens reflects light from a vehicle to which the vehicle marker is affixed.

10. The lens of claim 1, wherein the lens further comprises at least one mounting aperture for receiving a mounting fixture therethrough in order to affix the vehicle marker to a vehicle.

11. The lens of claim 1, comprising two rectangularly shaped second arcuate portions on two opposite sides of the first arcuate projection.

12. The lens of claim 11, wherein the first width is greater than the second width.

13. The lens of claim 1, wherein the lens is substantially rectangular in shape.

14. The lens of claim 1, wherein the lens is substantially circular in shape.

15. The lens of claim 1, wherein the second portion is elongated.

16. The lens of claim 1, wherein the second curvature is greater than the first curvature.

17. A lens mountable to a housing of a vehicle marker having a plurality of light emitting LEDs, the lens being formed of a translucent material and having a projection having:

a rounded projection having a first width having a first radius and a first depth;

an elongated projection having a second width having a second radius and a second depth;

wherein the first radius is greater than the second radius and the first depth is greater than the second depth;

wherein the angle of dispersion of the light changes between the rounded projection and the elongated projection along the length of the projection, the projection being adapted to be disposed opposite the plurality of LEDs of the vehicle marker so that light emitted from the plurality of LEDs can be viewed at an angle greater than 20° axial orientation of each LED.

* * * * *